United States Patent

Elbers et al.

[11] Patent Number: 5,925,104
[45] Date of Patent: Jul. 20, 1999

[54] METHOD FOR MAKING A MULTIMEDIA APPLICATION EXECUTABLE ON HARDWARE PLATFORMS WITH VARIOUS DIFFERENT RESOURCE LEVELS, A PHYSICAL RECORD CONTAINING SUCH APPLICATION, AND AN APPARATUS FOR EXECUTING SUCH APPLICATION

[75] Inventors: Gerard J. Elbers, Eindhoven, Netherlands; Alain R.P. Bouffioux, Olne, Belgium

[73] Assignee: U.S. Philips Corporation, New York, N.Y.

[21] Appl. No.: 08/735,275

[22] Filed: Oct. 16, 1996

[30] Foreign Application Priority Data

Oct. 18, 1995 [EP] European Pat. Off. ............. 95202811

[51] Int. Cl.⁶ .................................................. G06F 13/00
[52] U.S. Cl. ......................... 709/231; 709/230; 709/247
[58] Field of Search ........................ 395/200.61, 200.6, 395/200.66, 200.77; 370/229, 466; 348/558, 408, 508, 568, 390, 718; 358/136, 133

[56] References Cited

U.S. PATENT DOCUMENTS

| 5,196,933 | 3/1993 | Henot ....................................... 358/136 |
| 5,216,503 | 6/1993 | Paik et al. ................................ 358/133 |
| 5,231,384 | 7/1993 | Kuriacose ................................ 358/141 |
| 5,363,138 | 11/1994 | Hayashi et al. ......................... 348/390 |
| 5,440,677 | 8/1995 | Case et al. .............................. 395/154 |
| 5,483,287 | 1/1996 | Siracusa ................................... 348/426 |
| 5,508,750 | 4/1996 | Hewlett et al. ......................... 348/558 |
| 5,546,118 | 8/1996 | Ido .............................................. 348/7 |
| 5,583,937 | 12/1996 | Ullrich et al. ............................ 380/20 |
| 5,666,161 | 9/1997 | Kohiyama et al. ..................... 348/408 |
| 5,684,714 | 11/1997 | Yogeshwar et al. ............... 364/715.02 |
| 5,717,394 | 2/1998 | Schwartz et al. ......................... 341/51 |
| 5,729,649 | 3/1998 | Lane et al. ................................ 386/68 |
| 5,745,380 | 4/1998 | Sandvoss et al. ....................... 364/514 |
| 5,835,881 | 11/1998 | Trovato et al. ......................... 701/211 |
| 5,854,927 | 12/1998 | Gelissen ................................... 395/705 |

*Primary Examiner*—Mehmet B. Geckil
*Attorney, Agent, or Firm*—Gregory L. Thorne

[57] ABSTRACT

Multimedia application information is stored for later executability on different platforms, such as Interactive Multimedia Distribution Format (IMDF) complying platforms. The application comprises a plurality of parallel information streams. Execution scalability is enabled by assigning to the streams a single string of quality level items that along the string indicate stepwise increasing quality levels. Each item specifies an associated decoding quality level for a particular stream.

19 Claims, 4 Drawing Sheets

An IMDF platform will have the following resource requirement table in memory

| Decoder type | Resource 1 | Resource 2 | Resource 3 | Resource 4 |
|---|---|---|---|---|
| MPEG-video level 1 | 5% | 20% | 2 MB | 0% |
| MPEG-video level 2 | 10% | 20% | 2 MB | 0% |
| MPEG-video level 3 | 10% | 20% | 2 MB | 0% |
| MPEG-video level 4 | 20% | 20% | 4 MB | 0% |
| MPEG-audio level 1 | ... | | | |
| MPEG-audio level 2 | ... | | | |
| MPEG-audio level 3 | | | | |
| MPEG-audio level 4 | | | | |
| 3D-Graphics level 1 | | | | |
| 3D-Graphics level 1 | | | | |
| 3D-Graphics level 1 | | | | |
| 3D-Graphics level 1 | 25% | 0% | 4 MB | 30% |

FIG. 5

METHOD FOR MAKING A MULTIMEDIA APPLICATION EXECUTABLE ON HARDWARE PLATFORMS WITH VARIOUS DIFFERENT RESOURCE LEVELS, A PHYSICAL RECORD CONTAINING SUCH APPLICATION, AND AN APPARATUS FOR EXECUTING SUCH APPLICATION

DEFINITIONS

The following definitions are given for better understanding:

Resource quantitative and/or qualitative properties of the platform such as MIPS of the CPU, memory size in Mbytes, bandwidth of bus in Mbits/sec.

Resource requirement necessary amount of such resources

Performance speed of a computer or CPU

Quality level level of functioning of a decoder, which has been defined independently of the platform

BACKGROUND TO THE INVENTION

The invention relates to a method for storing multimedia application information for execution on different platforms, said information comprising a plurality of information streams for presentation in parallel to a user. Multimedia application programs or applications should be executable on different platforms. Such platform must satisfy minimum requirements in terms of resources, for being able to guarantee that the application in question runs thereon correctly. In various cases the platform has more resources than the minimum. Advantageously, the application should be made scalable, to attain optimum quality level, given the resources of the actually available platform.

SUMMARY TO THE INVENTION

In consequence, amongst other things it is an object of the present invention to provide a method for storing multimedia application information, wherein such scalability is realized in a straightforward manner. Now, according to one of its aspects, the invention is characterized in that for enabling execution scalability of said application, said method collectively assigns to said streams a single string of quality level items that along said string indicate stepwise increasing quality levels, in that each item specifies an associated decoding quality level for a particular one of said streams. Their relative positions in the string give the priorities among the various streams, and also between the various quality levels for each single stream. Now first, for all streams together, specified minimum platform resources are necessary for the platform to be able to execute the application or not. Moreover, if additional resources are present, assigning thereof to the various streams on the basis of relative priorities is straightforward. This organization allows the platform to easily choose optimum quality level with respect to available resources.

By itself, multimedia executability on different platforms has been considered in EP A 731 971, corresponding U.S. Pat. No. 5,854,927 to the present assignee, and herein incorporated by reference. In the reference, the multimedia application itself has a multiplatform interpreter, and each actual platform is an instance of an abstract machine. The present invention may be used in such more complex environment, but it is already useful if platform resources differ only in quantitative performance.

In the organization according to the invention, the platform or player knows the resource requirements for each quality level of each decoder. These have been stored in the resource requirement table of the platform (cf. FIG. 5). Neither the data streams, nor the application itself need to know these, because generally, at configuring the data streams and writing the application, the target platform is not known yet. The data streams comprise the input data of all associated decoders. In general, no further information is required for realizing the organization of the present invention. The application comprises a model, realized as a real or notional string of items, which describes the incremental model or preference path of the application in view of respective decoder levels.

The resource requirements of a particular platform are fixed for each decoder and each associated quality level when configuring the platform. These are stored in the platform. The producing of the application implies the joining of the data streams in a real-time file, using the so-called disc builder. Furthermore, an incremental model of the application is built in the application, with one or more calls thereto. Generally, this model is separate from the data streams.

Advantageously, at least one such stream is associated to at least two non-contiguous items of said string. This means that when stream A gets a particular quality level, first the quality of stream B will be improved, before further improvement of stream A can be allowed.

Advantageously, the quality level items are assigned to said streams in a dynamic manner along said application when stored. The writer of an application can thereby decide that the preference amongst the various decoders may vary during the executing of the application. During the execution proper on a particular platform, this may influence the quality levels actually used, or not.

The invention also relates to a unitary physical record carrier containing such application and to a platform system for playing such multimedia application information, wherein the platform will automatically select appropriate quality levels for the various streams. Further advantageous aspects of the invention are recited in dependent Claims.

BRIEF DESCRIPTION OF THE DRAWING

These and further aspects and advantages of the invention will be described more in detail with reference to preferred embodiments disclosed hereinafter, and in particular with reference to the appended Figures that show:

FIG. 5 a platform resource requirement table;

GENERAL CONSIDERATIONS

In its most complete form, a multimedia and in particular, an Interactive Multimedia distribution Format (IMDF) application may contain two types of processing:

Stream Processing (SP) of audio-visual information streams, such as Video (MPEG), 2D- or 3D-graphics, audio (MPEG, MIDI, PCM, ADPCM), which streams must be processed in a time-conforming manner at the normal rendering speed a human user would expect.

Non-Stream processing (NSP) that is not directly related to such time-conforming audio-visual streams. For simplicity of wording, the informations relating thereto on the physical record carrier are nevertheless also called streams. This processing type can be subdivided into:

(a) Real-time constrained NSP, such as simulation calculations, e.g. a flight simulator (b) Non-real-time constrained NSP, such as a search in a data base or encyclopedia, for presenting stationary information.

At its low end, each application requires a platform with minimum resources; these may be defined in an applicable standard. On such minimum platform only a limited number of information streams and computations can be processed in parallel. A more powerful platform will in principle allow for a higher quality level compared to the minimum Examples of such resources are the recurrence frequency of CPU processing cycles, memory size, bus transfer capacity, and I/O-facilities. In certain circumstances the MIPS figure indicating the raw instruction processing speed may need recalculation to MOPS, that is the operation speed as pertaining to the stream in question. Also operational overhead, such as for loading of the whole or part of the application, may need to be taken into account. In case of a server or other multi-process environment, available resources may have to be shared among various applications that run concurrently.

For stream processing (SP), the resource management is done in three steps:
defining objective quality levels for all feasible decoders;
selecting an actual quality level for a particular decoder;
controlling decoder resources at a selected quality level.
Herein, decoders in fact are decoder programs that run in parallel on hardware that may be shared or not among various decoders.

In a first approach, non-stream processing (NSP) is considered to be fully determined by the application and non-scalable, as the platform cannot foresee what the NSP will be doing. This means that for NSP resource requirements must be known beforehand in the platform. The amount of allocated resources must be sufficient so that the application will always meet its deadlines if real-time constrained. If not real-time constrained, the allocated resources should be sufficient to avoid any long-term build-up of unfinished business. This generally means that the resources for NSP must be assigned as a whole. Subsequently, any remaining resources can be assigned to SP.

DETAILED DESCRIPTION OF PREFERRED EMBODIMENTS

Figure 1:
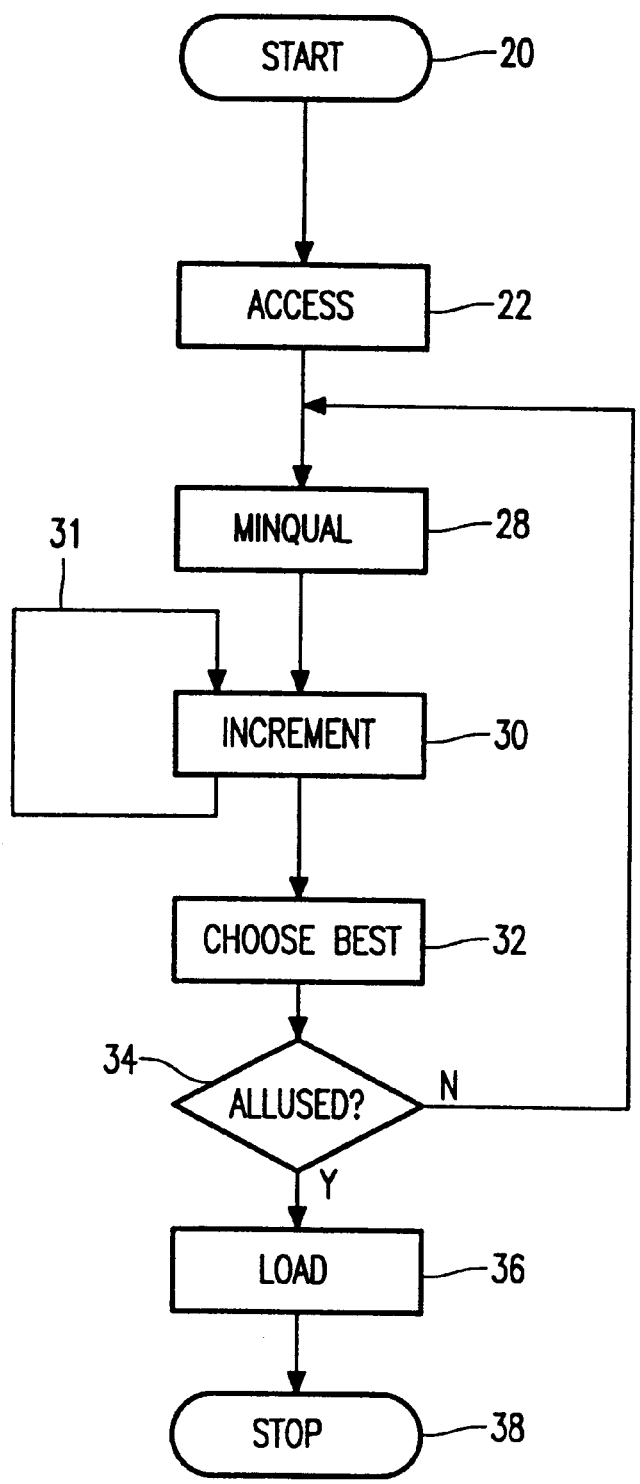
FIG. 1 a flow chart for storing an application according to the invention.

FIG. 1 shows a flow chart for storing an application according to the invention. The operations according to this flow chart can be executed directly after the general writing of the application. In block 20 the unprocessed information of the application is received, as pertaining to a particular time interval or scene. Generally, the scene size has been determined by the developer of the application. In so doing, the scene has been usually built up from things like music or movie intervals, stills, graphic elements and others. In the information, the data streams have usually been joined to an interleaved and multiplexed data file. Sufficient processing power is available for executing the application at its highest quality level. During execution of the application, often the processing is linear in time, in that the various streams are presented to a user in mutual synchronism, such as in the way of a movie. However, this behaviour need not be uniform in time, where at one time an image may freeze, while accompanying music goes on. In an interactive situation, the relative behaviours may be still more non-uniform. In block 22 the first unprocessed item of the application is accessed, in view of therefor determining its string of quality level items.

In block 28, the minimum quality level for executing the (part of the) application is assessed. This decision may be taken by the writer of the application. Next, the scene heading is now provided the minimally required quality levels of all decoders as a first item of the string of quality level items. Inasmuch as this first item may pertain to more than one decoder, it may be a composite item. For being able to attain automatic scalability, subsequent items of the string must now be arranged so that a stepwise increasing quality can be indicated by going along the items of the string. The operation in block 28 can be done either with the isolated scene, or in the context of preceding and/or succeeding scenes. Next, in block 30, exactly one of the streams which allows a plurality of different quality levels is taken at the next higher quality level, and the scene is executed again. This is repeated for each of the streams that have incrementable quality levels, which is symbolized by the looping line 31. When the scene has been executed with all possibilities for single-quality increment, in block 32 the best performance there amongst is chosen. This is generally a subjective action that is done by a designer person. This determines the next item of the string. As long as further quality improvement is possible (34), the system next goes back to block 30. If all streams have been executed at their respective top quality levels, the application scene is loaded (36). The ultimate result of the invention is a unitary carrier that is manufactured in standard manner for media of this kind. In block 38 the processing system is relinquished. For simplicity, only the loading of a single scene has been considered. However, one may decide to execute the flow chart of FIG. 1 again for the next scene.

Figure 2:
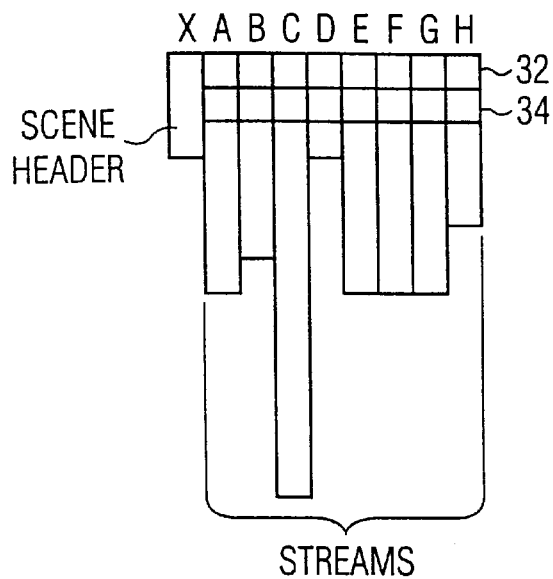
FIG. 2 a unitary record carrier so formed.

FIG. 2 symbolizes a unitary record carrier so formed. The carrier contains eight streams shown as separate columns. A through H For physical storage, generally a serializing operation is effected, such as for Compact-Disc Interactive; this can produce a real-time multiplexed file. Each streams accommodates a block 32 that contains an identifier, length, and various other references. The parallel character of the streams resides in the fact that they can be accessed for replay in an interleaved manner. For brevity, actual organization of physical storage has not been addressed. An exemplary solution has been disclosed in copending EP Patent Application 95202623.5, corresponding U.S. patent application Ser. No. 08/721,154 to the present assignee and herein incorporated by reference. In such interleaving, the player keeps track of the stream that is actually being accessed. As recited supra, the string of quality level items which indicates the stepwise increasing quality levels is stored in a scene header indicated by X in the Figure.

Figure 3:
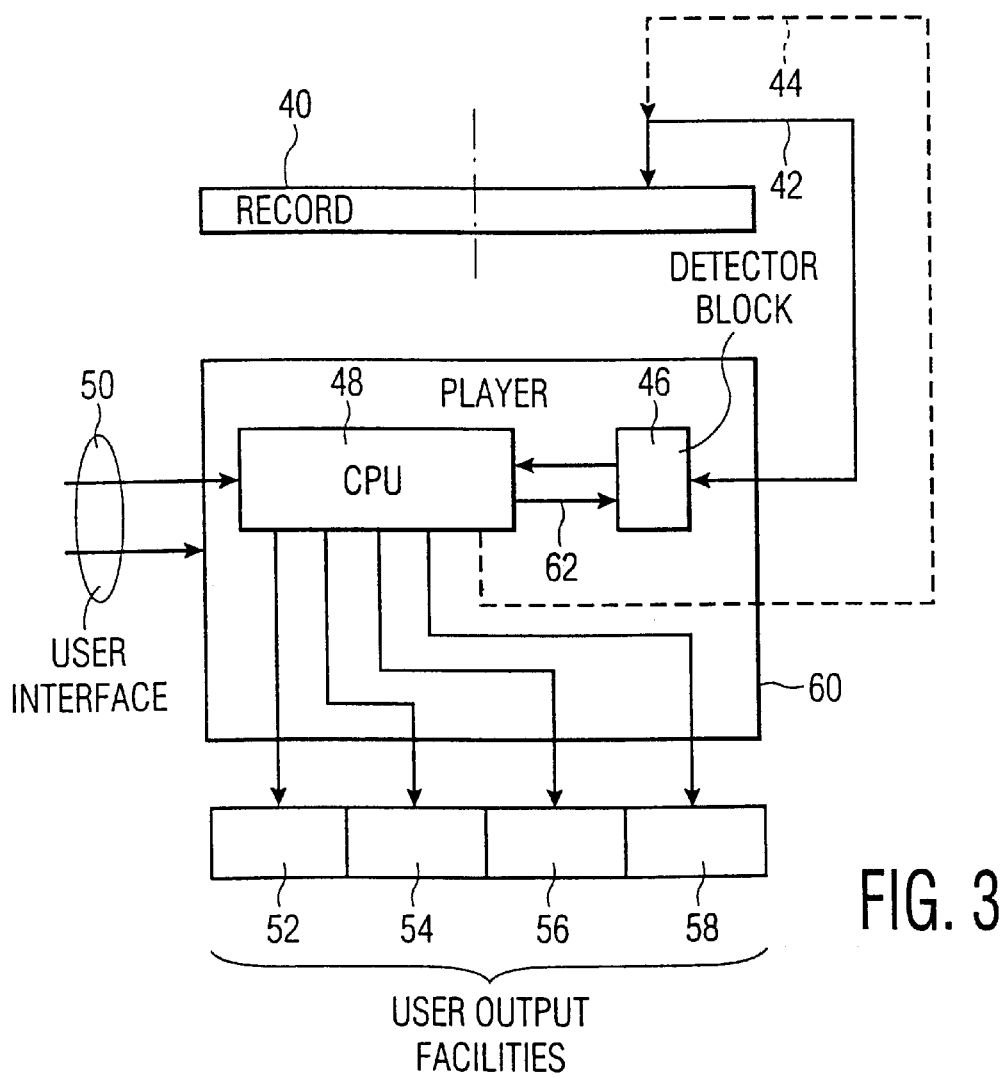
FIG. 3 a platform system for playing the record.

FIG. 3 shows a platform system for playing the record carrier. The disc-shaped record 40 is accessed by read arrangement 42 under control of positioning signals on line 44. The player proper 60 has user interface 50 for inputting user commands and detector block 46 for detecting the string of quality level items recited supra. This block also knows the required resources for the various quality levels of the various decoders, as pertaining to the platform in question. Therefore it may select the actually attainable level of quality, in that certain requirements can be met, but others would overtax the platform. This will hereinafter be discussed further. Central processing device 48 processes the streams in question in accordance with the above selection. Such processing may further be under control by user commands on interface 50. In principle, the user may overrule the quality levels selected by the platform. For example, a user may prefer audio representation above video, and therefor by preference allocate more resources to audio processing than according to the relative priorities assigned thereto by the designer of the application. Device 48 outputs various user information signals to various user output facilities 52, 54, 56, 58, that may contain audio channels, video channels, and data channels. Various ones of these may be collocated, such as the displaying of video and animation in parallel on the same screen. The processing also causes positioning on line 44 for read arrangement 42.

Hereinafter, resource management will be discussed more in detail. The processing device 48 includes various facilities, such as memory, bus, and I/O features. The information thereof is known to detector block 46, which also knows the amounts of resources necessary for the various quality levels. This allows device 46 to choose an optimum quality level that can be realized with the resources actually present, as pertaining to the actual application. If an appropriate level of performance has been chosen, the necessary resources are allocated, and the application may be executed. If the resources are however insufficient such as defined in terms of bandwidth, delay, error rate, or other, the player will inform the user and the execution of the application will remain blocked. Upon meeting a subsequent scene, the resource allocation may have to recommence. If the resource requirements are dynamically varying along the application, the application may signal minimum overall quality level required, so that the overall executability of the application may be decided by the platform. Subsequently, instantaneous quality of service may be nonuniform in time.

Figure 4:
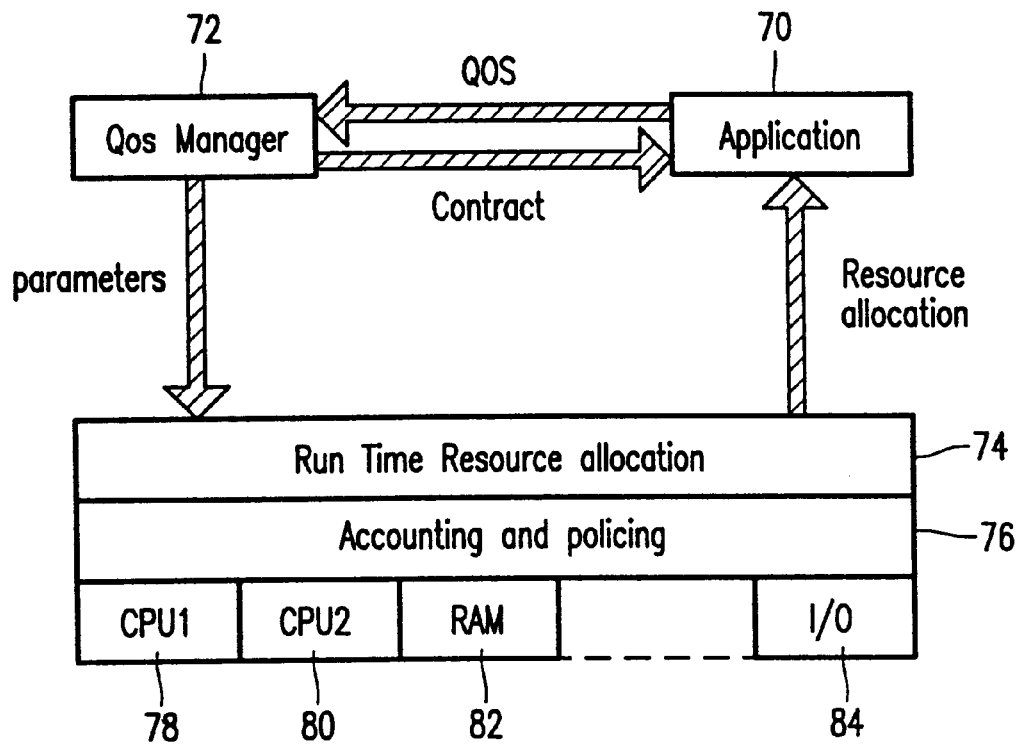
FIG. 4 a quality of service management diagram.

In this context, FIG. 4 shows a quality of service management diagram. Application 70 requests a particular quality of service to manager 72, which returns a contract proposal. If accepted, the manager sends the parameters to the processing. The latter does runtime resource allocation (74), accounting and policing (76), and controls hardware elements 78–84. Resources so allocated render their services to application 70.

FIG. 5 shows an exemplary resource requirement table that is present in the platform, inasmuch as the various streams, and consequently, the associated resource requirements have largely been standardized. Moreover, the application itself would not know the various resources present in the platform.

For MPEG video, the following objective quality levels for decoders may apply:
1. Black and white/half frame rate
2. Black and white/full frame rate
3. Full colour/half frame rate
4. Full colour/full frame rate For MPEG audio, the following objective quality levels for decoders may apply:
1. Mono
2. Stereo
3. Dolby surround
4. 5+1 surround (5 standard channels plus one for special effects)

For 3-D graphics, the following objective quality levels for decoders may apply:
1. 5000 triangles or polygons per frame
2–4. 10 k, 15 k, and 20 k triangles per frame, respectively.

In FIG. 5, the columns list the resources required by these various quality levels from known facilities in the platform. The requirements as listed may pertain to averages, average plus a safety margin such as 20%, or to worst case. Herein, resources 1–4 may be first processor, second processor, Memory, and I/O facilities, respectively. Each resource is an abstract entity characterized by a maximum performance value.

In case the available resources extend beyond the bare minimum necessary for executing a particular application, the platform must decide as to which decoder should perform at what quality level. For this deciding, it is necessary to know the relative importance of a particular stream to the application, and also the necessary resources for its execution; the first knowledge is brought about by the application, inasmuch as it could widely vary between applications; the second is present in the platform itself. A straightforward way is to describe the executability levels in an incrementing manner. The term decoder is used for the actual decoding software package. For example:

Application: create MPEG2 video decoder 1 at quality level 1
    create MPEG2 audio decoder 1 at quality level 1
    raise MPEG2 audio decoder 1 to quality level 2
    raise MPEG2 video decoder 1 to quality level 2
    raise MPEG2 audio decoder 1 to quality level 3
player 1
    raise MPEG2 video decoder 1 to quality level 3
    create MIDI-16 decoder 1 at quality level 1
player 2
    raise MIDI-16 decoder 1 to quality level 2
    raise MIDI-16 decoder 1 to quality level 3

As shown in this table, for full functionality of the application, all three decoders should operate at quality level 3. For each of two exemplary available platforms, the actual performance is lower, and is given by the maximum level attained above the interrupted line for each of the decoders in question. For example, a relatively simple player has no MIDI, video at level 2, and audio at level 3. A relatively higher performing player has MIDI at level 1, and both audio and video at level 3. Obviously, the contribution by MIDI to the application is judged to be of relatively less importance. In another application, the relative importances of the streams could be different. For example, MIDI could be rated at approximately the same level of relevance for quality as audio. A different player could have a so-called 'sound blasters' card on board, which causes MIDI decoding taking place outside the central processor facilities.

Figure 6:
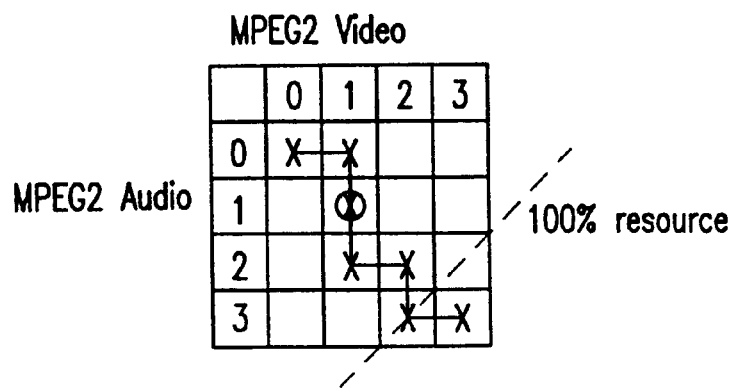
FIG. 6 a preference path diagram.

In this context, FIG. 6 shows a two-dimensional preference path diagram pertaining to a particular application, that has one dimension for each separate information stream of the application in question. For simplicity, a two-stream application has been taken in this example. The preference path is indicated as a solid line, and each cross therealong represents a sensible set of resources. Successive crosses indicate successive quality levels of playing the application. The preference path starts at the top left hand corner indicating zero resources. Subsequent crosses along the solid line correspond to successive rows in the same manner as given for the three-stream application considered earlier. Now, a particular cross (such as the one encircled) indicates minimum resources requirements for executing the application on the platform in question. The platform tries to attain the best quality level, as represented by the farthest cross along the line of crosses.

Moreover, the dotted line indicates the full resources of the platform. The last cross not beyond this line indicates the maximum quality available by this particular platform. If the application has many streams in parallel, the matrix has as many dimensions, and moreover need not be static. In certain situations, the platform need not keep strictly along the line of the diagram. For example, if MPEG-3 audio would just overtax the platform, the latter could still try whether MPEG-3 video (later in the sequence of steadily improving quality levels) could be feasibly executed by the platform. If yes, the latter may be included in the execution.

For the application, the specifying of the relative importance sequence may be a laborious task, especially if the number of streams is large and the assignment of relative importances is dynamic. Note that the number of streams may indeed be large, inasmuch as the number of languages may increase, the audio may be standard or karaoke, and also video may presented in more versions in parallel. To simplify this, a relative importance is assigned to each decoder, and these are mapped on an elementary model. Such is done as follows:

The importance of a decoder is its minimally allowed quality level; this will corresponds to its first appearance in the incremental description.

The quality of each decoder is incremented in the order in which they are opened.

The quality of each decoder is incremented till it reaches maximum quality.

For example, an importance scheme with highest quality for each decoder at 3, and given as:
Decoder1=OpenDecoder (MPEG2, Video,2)
Decoder2=OpenDecoder (MPEG2, Audio,2)
Decoder3=OpenDecoder (MIDI-16, 1)
will give the following incremental description:
create MPEG2 video decoder 1 at quality level 2;
create MPEG2 audio decoder 1 at quality level 2;
create MIDI-16 decoder 1 at quality level 1;
raise MPEG2 video decoder 1 to quality level 3;
raise MPEG2 audio decoder 1 to quality level 3;
raise MIDI-16 decoder 1 to quality level 2;
raise MIDI-16 decoder 1 at quality level 3.

To select the quality level of each decoder, we start at the beginning of the incremental model. The decoders are created at a certain quality level and each decoder quality level is incremented following the preference path described in the incremental model. For each decoder that is created and for each quality level that is incremented, the resource requirements are looked up in the resource requirement table and added up to get the total resource requirements of the application. If the requirements for one of the resources exceeds its maximum value (i.e. 100%), no more decoder quality is implemented. This is the end of the preference path of this platform for the actual application or scene.

We claim:

1. A method for storing multimedia application information for execution on different platforms, said information comprising a plurality of information streams for presentation in parallel to a user,
characterized in that for enabling execution scalability of said application, said method collectively assigns to said streams a single string of quality level items that along said string indicate stepwise increasing quality levels, in that each item specifies an associated decoding quality level for a particular one of said streams.

2. A method as claimed in claim 1, wherein at least one such stream is associated to at least two non-contiguous items of said string, that are separated by at least one item pertaining to another stream.

3. A method as claimed in claim 2, wherein the quality level items are assigned to said streams in a dynamic manner along said application when stored.

4. A method as claimed in claim 2, for a number of streams that is at least equal to three and to each of which are assigned at least two such quality levels.

5. A method as claimed in claim 1, wherein the quality level items are assigned to said streams in a dynamic manner along said application when stored.

6. A method as claimed in claim 5, for a number of streams that is at least equal to three and to each of which are assigned at least two such quality levels.

7. A method as claimed in claim 1, for a number of streams that is at least equal to three and to each of which are assigned at least two such quality levels.

8. A unitary physical record carrier containing a comprehensive multimedia application, said application comprising a plurality of information streams for presentation in parallel to a user,
characterized by for enabling execution scalability of said application, said application has collectively assigned to said streams a single string of quality level items that along said string indicate a stepwise increasing quality levels, in that each item specifies an associated amount of associated decoding quality level for a particular one of said streams.

9. A record as claimed in claim 8, wherein at least one such stream is associated to at least two non-contiguous items of said string, that are separated by at least one item pertaining to another stream.

10. A record as claimed in claim 9, and comprising a plurality of said strings, each pertaining to a particular part of said application, and wherein the quality level items are assigned to said streams in a dynamic manner in said respective strings.

11. A record as claimed in claim 9, for a number of streams that is at least equal to three and to each of which are assigned at least two such quality levels.

12. A record as claimed in claim 8, and comprising a plurality of said strings, each pertaining to a particular part of said application, and wherein the quality level items are assigned to said streams in a dynamic manner in said respective strings.

13. A record as claimed in claim 12, for a number of streams that is at least equal to three and to each of which are assigned at least two such quality levels.

14. A record as claimed in claim 8, for a number of streams that is at least equal to three and to each of which are assigned at least two such quality levels.

15. A unitary physical record carrier containing a comprehensive multimedia application as claimed in claim 8, wherein at least one such stream is associated to at least two non-contiguous items of said string, that are separated by at least one item pertaining to another stream,
characterized by for enabling execution scalability of said application, said application has collectively assigned to said streams a single string of quality level items that along said string indicate a stepwise increasing quality levels, in that each items specifies an associated amount of associated decoding quality level for a particular one of said streams.

16. A unitary physical record carrier containing a comprehensive multimedia application as claimed in claim 8, wherein the quality level items are assigned to said streams in a dynamic manner along said application when stored,
characterized by for enabling execution scalability of said application, said application has collectively assigned to said streams a single string of quality level items that along said string indicate a stepwise increasing quality levels, in that each items specifies an associated amount of associated decoding quality level for a particular one of said streams.

17. A unitary physical record carrier containing a comprehensive multimedia application as claimed in claim 8, wherein for a number of streams that is at least equal to three and to each of which are assigned at least two such quality levels, characterized by for enabling execution scalability of said application, said application has collectively assigned to said streams a single string of quality level items that along said string indicate a stepwise increasing quality levels, in that each items specifies an associated amount of associated decoding quality level for a particular one of said steams.

18. A platform system for playing multimedia application information from a storage medium, which application is executable on a range of different platforms and comprises a plurality of parallel information streams, characterized in that for enabling execution scalability along said range, wherein said application has collectively assigned to said streams a single string of quality level items that along said string indicate stepwise increasing quality levels, in that each item specifies an associated quality level for a particular one of said streams, said platform has interrogating means for interrogating said items along said string and accumulating all platform resources required for a particular quality level item, and comparing means fed by said interrogating means for comparing required platform resources to actual platform resources, and selecting means fed by said comparing means for selecting an optimum quality level as providable by the platform for the application in question.

19. A platform system as claimed in claim 18, and having search means for searching additional string items beyond an item representing matching required platform resources to maximum available platform resources, whilst passing beyond an item overtaxing platform resources and pertaining to a first information stream, in favour of an item pertaining to a second information stream and commensurate with available platform resources, therewith improving said performance quality.

* * * * *